US 8,479,176 B2

(12) United States Patent
Ottoni et al.

(10) Patent No.: US 8,479,176 B2
(45) Date of Patent: Jul. 2, 2013

(54) REGISTER MAPPING TECHNIQUES FOR EFFICIENT DYNAMIC BINARY TRANSLATION

(75) Inventors: Guilherme D. Ottoni, Campbell, CA (US); Hong Wang, Santa Clara, CA (US); Wei Li, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 12/815,023

(22) Filed: Jun. 14, 2010

(65) Prior Publication Data

US 2011/0307876 A1   Dec. 15, 2011

(51) Int. Cl.
*G06F 9/45* (2006.01)
(52) U.S. Cl.
USPC .................... 717/136; 717/138; 717/158
(58) Field of Classification Search
USPC ................ 717/140, 148, 151, 153
See application file for complete search history.

(56) References Cited

U.S. PATENT DOCUMENTS

| | | | | |
|---|---|---|---|---|
| 5,842,017 A * | 11/1998 | Hookway et al. | ............. | 717/158 |
| 6,091,897 A * | 7/2000 | Yates et al. | .................... | 717/138 |
| 6,535,903 B2 * | 3/2003 | Yates et al. | .................... | 718/100 |
| 6,625,807 B1 * | 9/2003 | Chen | ............................. | 717/154 |
| 6,763,452 B1 * | 7/2004 | Hohensee et al. | ............. | 712/227 |
| 6,820,255 B2 * | 11/2004 | Babaian et al. | ............... | 717/151 |
| 6,862,730 B1 | 3/2005 | Gorti et al. | | |
| 7,076,769 B2 * | 7/2006 | Baraz | ............................ | 717/136 |
| 7,260,705 B2 * | 8/2007 | Wang et al. | .................... | 712/209 |
| 7,260,815 B1 * | 8/2007 | Chen et al. | .................... | 717/134 |
| 7,275,246 B1 * | 9/2007 | Yates et al. | .................... | 718/100 |
| 7,596,781 B2 | 9/2009 | Fulton et al. | | |
| 7,712,092 B2 | 5/2010 | Bansal et al. | | |
| 7,805,710 B2 * | 9/2010 | North | ............................ | 717/136 |
| 2003/0154419 A1 * | 8/2003 | Zang et al. | ....................... | 714/2 |
| 2005/0015758 A1 * | 1/2005 | North | ............................ | 717/138 |
| 2005/0086650 A1 * | 4/2005 | Yates et al. | .................... | 717/139 |
| 2007/0006178 A1 * | 1/2007 | Tan | .............................. | 717/136 |

(Continued)

FOREIGN PATENT DOCUMENTS

| | | |
|---|---|---|
| JP | 1-217632 A | 8/1989 |
| WO | 2005008479 | 1/2005 |
| WO | 2011/159739 A2 | 12/2011 |
| WO | 2011/159739 A3 | 4/2012 |

OTHER PUBLICATIONS

Chen et al., "On Static Binary Translation and Optimization for ARM based Applications", 2008, pp. 1-27.*

(Continued)

*Primary Examiner* — Thuy Dao
*Assistant Examiner* — Stephen Berman
(74) *Attorney, Agent, or Firm* — Grossman, Tucker, Perreault & Pfleger, PLLC (57) ABSTRACT

Generally, the present disclosure provides a system and method for mapping registers from a system with more registers to a system with fewer registers. Regions may be formed that include one or more blocks of code with relatively frequent register accesses. The most frequently accessed source registers may be mapped to target registers. Each block in the region may be bounded by a prologue and at least one epilogue. The prologue may be configured to implement register mapping and the epilogue(s) may be configured to manage program flow from a block in the region to another block in the region or to a block not in the region.

21 Claims, 5 Drawing Sheets

U.S. PATENT DOCUMENTS

| | | | |
|---|---|---|---|
| 2007/0079304 A1 | 4/2007 | Zheng et al. | |
| 2008/0040710 A1* | 2/2008 | Chiriac | 717/136 |
| 2008/0091923 A1* | 4/2008 | Fulton et al. | 712/211 |
| 2008/0216073 A1* | 9/2008 | Yates et al. | 718/100 |
| 2009/0172654 A1* | 7/2009 | Zhao et al. | 717/158 |
| 2010/0115494 A1* | 5/2010 | Gorton, Jr. | 717/128 |

OTHER PUBLICATIONS

Zhang et al., "Optimizing Dynamic Binary Translation for SIMD Instructions", 2006, Proceedings of the International Symposium on Code Generation and Optimization (CGO'06), pp. 1-12.*

Sites et al., "Binary Translation", 1993, Communications of the ACM/Feb. 1993/vol. 36, No. 2, pp. 69-81.*

International Search Report and Written Opinion received for PCT application No. PCT/US2011/040406, mailed on Feb. 17, 2012, 8 Pages.

Probst, M.; Krall, A.; Scholz, B.; , "Register liveness analysis for optimizing dynamic binary translation," Reverse Engineering, 2002. Proceedings. Ninth Working Conference on , vol., no., pp. 35-44, 2002.

Bala, et al., "Dynamo: A Transparent Dynamic Optimization System", ACM SIGPLAN 2000 Conference on Programming Language Design and Implementation (PLDI 00), Vancouver, British Columbia, Canada, XP002286540, ISBN: 978-1-58113-199-4, Jun. 18, 2000,12 Pages.

Extended European Search Report received for European Patent Application 11169050.9, mailed on Nov. 30, 2011, 8 pages.

Ebcioglu, et al. "Dynamic Binary Translation and Optimization", IEEE Transactions on Computers, vol. 50, No. 6, Jun. 2001, pp. 529-548.

Baraz, et al. "IA-32 Execution Layer: a two-phase dynamic translator designed to support IA-32 applications on itanium®-based systems", IEEE Computer Society, Proceedings of the 36th International Symposium on Microarchitecture (MICRO-36'03), 2003, 11 pages.

Bansal, et al. "Binary Translation Using Peephole Superoptimizers", 8th USENIX Symposium on Operating Systems Design and Implementation, USENIX Association, Dec. 2008, pp. 177-192.

Bellard, "QEMU, a Fast and Portable Dynamic Translator", FREENIX Track: 2005 USENIX Annual Technical Conference, USENIX Association, 2005, pp. 41-46.

Chernoff, et al., "A Profile-Directed Binary Translator", FX!32, IEEE Micro, 1998, pp. 56-64.

Wu, et al., "Godson-3: A Scalable Multicore Risc Processor With X86 Emulation", IEEE Computer Society, IEEE Micro, Mar./ Apr. 2009, pp. 17-29.

Chen, et al., "On Static Binary Translation and Optimization for ARM based Applications", Mar. 24, 2009, pp. 10.

Dehnert, et al., "The Transmeta Code Morphing™ Software: Using Speculation, Recovery, and Adaptive Retranslation to Address Real-Life Challenges", Proceedings of the international symposium on Code generation and optimization: feedback-directed and runtime optimization, IEEE, 2003, pp. 15-24.

Probst, "Fast Machine-Adaptable Dynamic Binary Translation", Proceedings of the Workshop on Binary Translation, 2001, pp. 1-7.

Wang, et al.,"StarDBT: An Efficient Multi-platform Dynamic Binary Translation System", Advances in Computer Systems Architecture, vol. 4697, 2007, pp. 4-15.

European Office Action from related applicatoin EP11169050.9 mailed Oct. 2, 2012.

International Preliminary Report on Patentability from related matter PCT/US2011/040406.

Office Action from related Russian Application 2011153335 mailed Feb. 26, 2013.

Office Action from related Japan Patent Application No. 2011-130887, mailed Mar. 19, 2013.

* cited by examiner

REGISTER MAPPING TECHNIQUES FOR EFFICIENT DYNAMIC BINARY TRANSLATION

FIELD

The present disclosure relates to dynamic binary translation, and, more particularly, to an efficient technique for performing dynamic binary translation from an instruction-set architecture ("ISA") with more registers to an ISA with fewer registers.

BACKGROUND

Dynamic Binary Translation (DBT) has been widely used as a means to run applications created for one instruction-set architecture (ISA) on top of a different ISA. Given the amount of legacy software developed for PCs, based on the x86 ISA, attention has been given to translating x86 to other ISAs. Recent trends in industry for both smaller ultra-mobile PCs and more powerful embedded and mobile internet devices (e.g., smart phones) are blurring the boundaries between these distinct markets. As a result, this market convergence is creating great interest in DBT from ISAs that currently dominate the embedded and mobile-internet-device markets (e.g., ARM (ARM Holdings), MIPS (MIPS Technologies), and PowerPC (Apple-IBM-Motorola alliance)) to x86 (Intel Corporation).

Binary Translation ("BT") is a general technique to translate binaries built for one source ("guest") ISA to another target ("host") ISA. Using BT, it is possible to execute application binaries built for one processor ISA on a processor with a different architecture, with no need to recompile high-level source code or rewrite assembly code. Since most legacy computer applications are available in binary formats only, BT is very attractive due to its potential to allow a processor to execute applications that are not built and available for it. Several successful BT projects have advanced the state of the art over the past decades, including Digital Equipment Corporation's ("DEC") FX!32, Intel's IA-32 EL, Transmeta's CMS ("Code Morphing Software"), Godson-3 (MIPS architecture), and IBM's DAISY ("Dynamically Architected Instruction Set from Yorktown"). Most of these tools aim at running legacy x86 applications on processors such as Alpha (DEC), Itanium (Intel), Crusoe (Transmeta), and MIPS (MIPS Technologies).

Most of the tools mentioned above use Dynamic BT (DBT), meaning that they perform the translation on-the-fly as the application is executed, i.e., at run time. Alternatively, BT can be performed off-line, i.e., Static BT (SBT). The dynamic usage model is usually preferred because it is more general (e.g., able to handle self-modifying code) and it works transparently to the user with a simple OS change to automatically invoke the DBT for non-native binaries. The main drawback of DBT, compared to SBT, is the overhead. The cycles spent in translating and optimizing an application are cycles that could otherwise be used to actually execute the application code. Therefore, DBT tools face a trade-off between the time spent on translation/optimization and the quality of the resulting code, which in turn is reflected in the execution time of the translated code.

The challenges faced by a DBT are highly dependent on the source and target ISAs. Recently, there has been great interest in expanding the use of the x86 ISA into the ultra-mobile and embedded market segments (e.g., Intel's Atom processor). From a user's perspective, this is very convenient because it may enable legacy PC software to efficiently run on embedded and ultra-mobile platforms. However, for x86 to be adopted in these new domains, it is also necessary to enable x86 to execute the enormous software-base available in these segments, which are mainly based on ARM (ARM Holdings), MIPS (MIPS Technologies), and PowerPC (Apple-IBM-Motorola alliance) ISAs. For example, in the future x86-based smart phones, besides potentially running PC applications, it would be beneficial to be able to download and seamlessly run ARM-based applications from, e.g., Apple's iPhone App Store. Challenges to enabling this scenario include keeping DBT's performance and energy overheads low.

Although a variety of DBT systems have been proposed, most of them follow the same basic execution flow. First, a binary file created for the source (guest) architecture is loaded into memory. Sections of this source binary are then translated into target (host) binary code. This translation is typically done "on-demand". In other words, the source-code instructions are translated as the flow of control reaches them. Typically, the translation is performed at the granularity of basic blocks, which are sequences of instructions with a single entry and potentially multiple exits. Once a basic block is translated, the translation is kept in a translation cache (also called code cache) in memory for future reuse. The most aggressive DBT systems perform different levels of optimizations. Following Transmeta's CMS and other DBT systems, these optimization levels are termed "gears". First, a very quick translation (Gear-1) is used. This gear aims at being very fast, at the cost of poor quality of the translated code. This trade-off tends to be ideal for rarely executed code, such as OS boot code. In Gear-1, DBTs also implement probes (counters) to detect "hot" (i.e., frequently executed) basic blocks. Once a block becomes hot, it and its correlated surrounding blocks are merged into a region. This region is then retranslated by a higher gear, which applies additional optimizations to the code. This same strategy can be repeated for an arbitrary number of gears. For instance, Transmeta's CMS uses four gears. In effect, a gear-based system ensures that, the more a region of code contributes to the total runtime, the more time is spent optimizing it to produce faster code.

The set, number, and aggressiveness of the optimizations applied greatly vary from one DBT to another. Typical optimizations include: instruction scheduling, dead-code elimination, and redundancy elimination. In fact, similar to static compiler optimizations, the set of most relevant optimizations depends on the target architecture. Contrary to compiler optimizations though, in a DBT, these optimizations have precise runtime information, which can be used to obtain higher-quality code. The main disadvantage of DBTs compared to static compilers is a much tighter optimization-time budget.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

A challenge faced by dynamic binary translation ("DBT") is the overhead that it incurs. This overhead comes mainly from relatively frequently used features in the guest ("source")-ISA that are not easily mapped to the host ("target")-ISA. For example, when the source-ISA has a larger register set than the target-ISA, using an efficient register mapping from the source registers to the target registers is important in order to reduce register emulation overhead, e.g., memory accesses. This is particularly important for target-ISAs such as x86 and x86-64, which have a relatively small number of general-purpose/integer registers (e.g., 8 and 16) compared to other ISAs, e.g., PowerPC, ARM and MIPS that have 32 registers and Itanium that has 128 registers.

The register mapping problem is aggravated by the fact that the optimal mapping (i.e., the mapping that results in the smallest overhead) is highly dependent on the source binary code sequence, and thus it varies from one portion of the code to another. Ideally, each code region should use the register mapping that is optimal to it.

The present disclosure provides a system and method configured to provide region level register mapping. The method includes, for each binary code block in a region, mapping at least some of the most frequently accessed source processor registers in the region to target processor registers. The most frequently accessed source processor registers may be determined from probe(s), including counters, implemented with blocks of target binary code corresponding to blocks of source binary code. A block of optimized target binary code may then be generated for each block of source binary code in a region selected for optimization. The block of optimized target binary code may include a prologue, a body including translated source binary code, a jump on condition and at least one epilogue. The prologue is configured to load mapped or mapped live-in registers for the region. The jump on condition is configured to control flow based on whether a branch at a boundary of the block of source binary code is to a next binary block in the region or to a next binary block not in the region. The epilogue(s) are configured to jump to a block body if the next binary block is in the region or to a beginning of the next binary block if the next binary block is not in the region. Beginning may correspond to a prologue of an optimized target binary code block in another region or to an unoptimized target binary code block. If the next binary block is not in the region, live-out registers for the region may be stored in memory. Advantageously, memory accesses may be reduced by loading mapped or mapped live-in registers for the region when crossing region boundaries rather than each time an optimized block of target binary code is executed.

A method and/or system consistent with the present disclosure is configured to provide region level register mapping. The regions may be relatively complex. For example, a region may include arbitrary loop nest(s), i.e., arbitrary combination(s) of loops, e.g., multiple siblings inside a parent loop, as will be understood by one skilled in the art. In another example, a region may include target binary code blocks corresponding to an irreducible flow graph, e.g., multiple possible entries into a loop. A region may be formed of contiguous and/or non-contiguous target binary code blocks.

Figure 1:
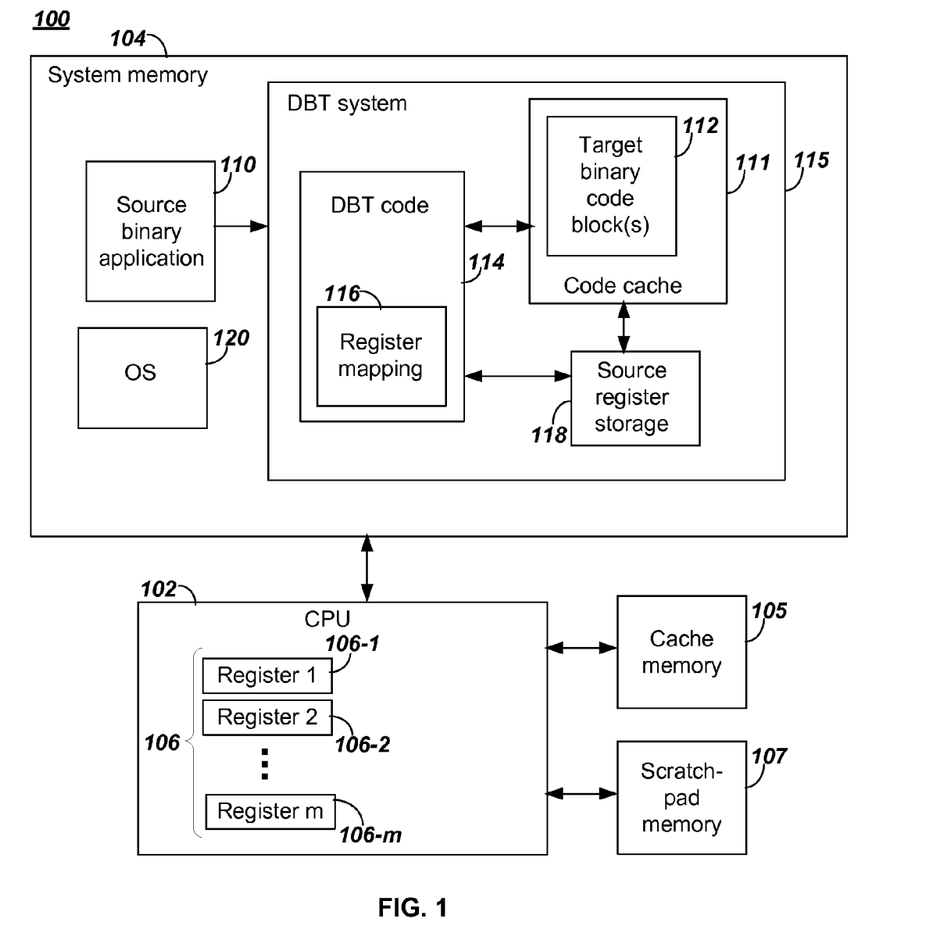
FIG. 1 depicts a memory system consistent with the present disclosure.

FIG. 1 depicts a system 100 consistent with the present disclosure. System 100 includes a processor ("CPU") 102 coupled to system memory 104. The system 100 may include cache memory 105 (which may be included with system memory 104) and/or scratch-pad memory 107, similar to cache memory but managed by software. The CPU 102 may include a plurality of processor registers 106-1, 106-2, . . . , 106-$m$, collectively 106. CPU 102 may include a plurality of core processing units (hereinafter "cores" or singularly "core") and each core may be configured to execute a plurality of threads. System memory 104 may host a source binary application 110, dynamic binary translation system 115 and a host operating system ("OS") 120. The dynamic binary translation system 115 may include target binary code block(s) 112, dynamic binary translator code 114 including a register mapping module 116 and/or source register storage 118. The source binary application 110 may include a plurality of source binary code blocks corresponding to a source ISA. The target binary code block(s) correspond to a target ISA. A source binary code block is a sequence of one or more instructions that includes, e.g., ends with, a branch instruction. A target binary code block is configured to include functionality of a corresponding source binary code block. An optimized target binary code block may include functionality of the corresponding source binary code block in a body of the optimized target binary code block. The optimized target binary code block may include additional functionality, as described herein.

The target binary code block(s) 112 may be stored in an area of system memory designated "code cache" 111. Code cache 111 may be understood as storage for target binary code block(s) 112, i.e., one or more target binary code block(s) 112 that have been translated from one or more corresponding source binary code block(s). The system memory 104 may host source register storage 118 configured to load/store data to/from processor registers 106. In some embodiments, cache memory 105 and/or scratch-pad memory 107 are configured to load/store data to/from processor register(s) 106.

Dynamic binary translator code 114 and register mapping module 116 may be executed by one or more cores to operate on source binary application 110 to transform block(s) of source binary application 110 into target binary code block(s) 112. A source binary code block may be translated into a target binary code block dynamically. In other words, the source binary code block may be translated into the target binary code block in response to a call to execute the binary block rather than statically, i.e., prior to run time. The target binary code block may then be stored in system memory 104 in the code cache 111 and provided to CPU 102 for execution. Transforming block(s) of source binary code 110 into target binary code block(s) 112 may include mapping one or more source registers to one or more target registers, e.g., processor register(s) 106, based at least in part on frequency of register access for the region. For example, the source-ISA may include $N_s$ source registers and the target-ISA may include $N_t$ target registers, e.g., registers 106, where $N_t$ is less than $N_s$.

Figure 2A:
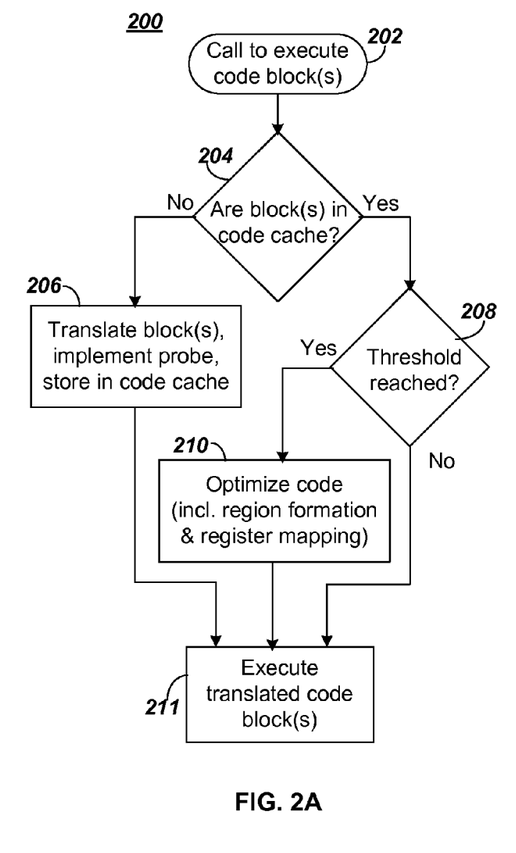
FIG. 2A depicts a flowchart of exemplary operations for a dynamic binary translator consistent with the present disclosure.

FIG. 2A depicts a flow chart 200 for a dynamic binary translator. The operations of flow chart 200 may be performed by dynamic binary translator code 114. Program flow may begin with receipt of a call to execute binary code block(s) 202. It is assumed that prior to the call to execute binary code block(s) 202, source binary application 110 has been loaded into system memory 104. At operation 204, whether the one or more target binary code block(s) are in a code cache, e.g., code cache 111, may be determined. Each target binary code block corresponds to a source binary code block of the source binary application 110. If the target binary code block(s) are not in the code cache, operation 206 may include translating the source binary code block(s) into target binary block(s), implementing probe(s) and storing the target binary block(s) and probe(s) in the code cache. This translation may be configured to be relatively fast. For example, probe(s) may include counter(s) configured to maintain a count of a number of times a binary block is executed. Source processor register(s) may be mapped to register storage, e.g., source register storage 118, in system memory 104, cache memory 105 and/or scratch-pad memory 107. Program flow may then proceed to operation 211. At operation 211, translated code block(s) may be executed. If, at operation 204, the target binary code block(s) are in the code cache, program flow may proceed to operation 208.

At operation 208, whether a threshold has been reached may be determined. Whether the threshold has been reached may be determined based, at least in part, on the probe(s) implemented at operation 206, in response to a prior call to execute code block(s). For example, a count may be incremented each time a binary block is executed. If the count reaches a predetermined threshold, then the probe may be configured to return program flow (i.e., branch) to the dynamic binary translator for further processing. The predetermined threshold may be configured to indicate a relatively frequently executed binary block that may benefit from optimization. If the threshold has not been reached, program flow may proceed to operation 211, execute translated code block(s). If the threshold has been reached, program flow may proceed to operation 210, optimize code. Optimizing code 210 is configured to include region formation and register mapping, as described herein. Program flow may then proceed to operation 211, execute translated code block(s).

Figure 2B:
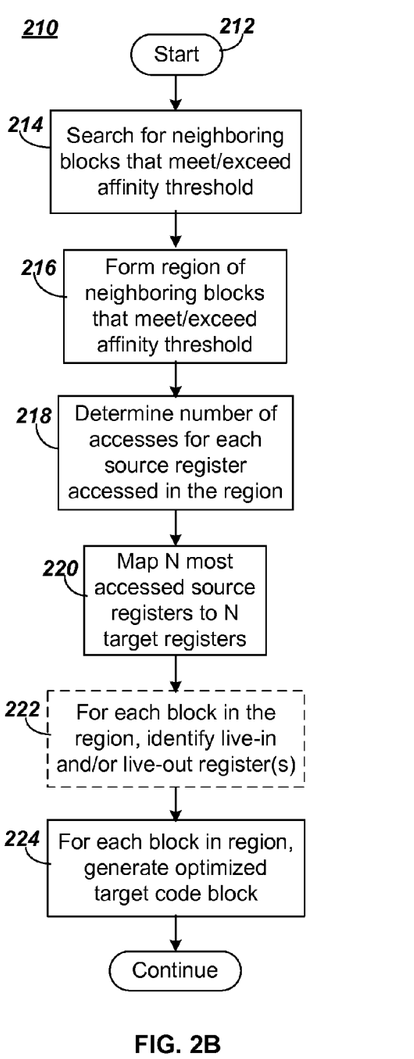
FIG. 2B depicts a flowchart of exemplary operations for optimizing code consistent with the present disclosure.

FIG. 2B depicts a flow chart 210 for optimizing code consistent with the present disclosure. Program flow may begin at start 212. The operations of flow chart 210 may be performed by dynamic binary translator code 114, including register mapping module 116. At operation 214, a search may be conducted for neighboring binary blocks that meet and/or exceed an affinity threshold. Neighboring binary blocks may be related to the binary block that triggered the code optimization. For example, neighboring binary block(s) may be configured to be executed just prior or just after the binary block that triggered the code optimization. Neighboring binary block(s) may be contiguous with the triggering binary block and/or may be related to the triggering binary block by a branch or jump. Affinity between or within binary blocks may be understood as a correlation in likelihood of execution of the binary blocks. For example, the correlation may be due to branching from one binary block to another binary block. At operation 216, a region may then be formed including neighboring binary blocks that meet and/or exceed the affinity threshold.

At operation 218, a number of accesses may be determined for each source register accessed in the region. An instruction in the region may use, i.e., read from, a source register, and/or may define, i.e., write to, a source register. Register access, i.e., register usage, includes using and/or defining the register. Register mapping may be based on a total number of accesses of each source register in the region.

For example, the region formed at operation 216 may include one or more binary code block(s). A probe, including a count of the number of executions of the binary block, may be associated with each binary code block. For each binary block, a number of register accesses may be determined based on the count of the number of executions of the binary block, the instructions in the binary block and the registers accessed by each instruction. The total number of accesses for each register accessed in the region may then be determined by summing the number of accesses for each register in each binary block in the region.

Figure 3:
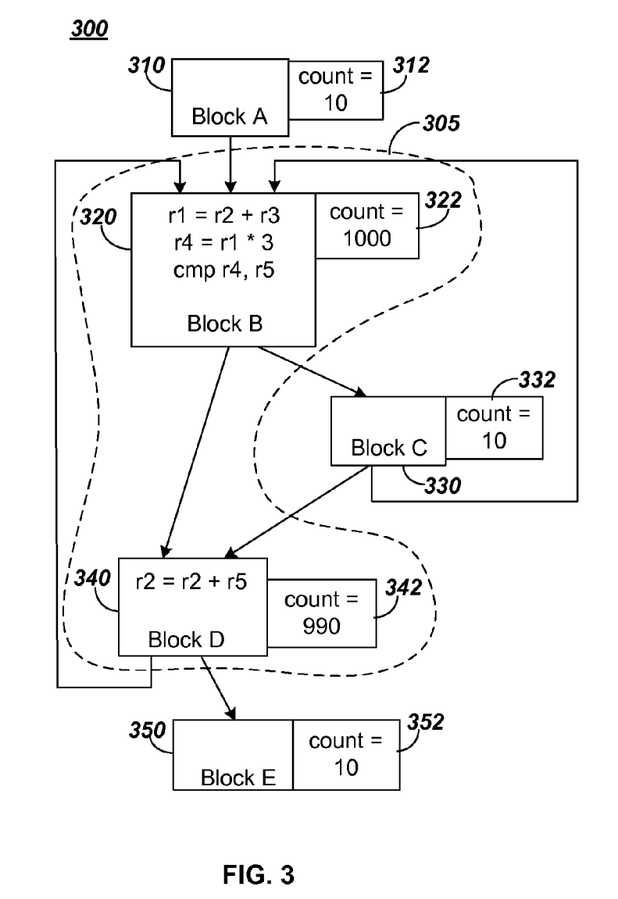
FIG. 3 depicts an exemplary control flow graph including a region of frequently executed code blocks.

FIG. 3 depicts an exemplary control flow graph 300 including an exemplary region 305 of code. The control flow graph 300 includes five blocks of code: Block A 310, Block B 320, Block C 330, Block D 340 and Block E 350. Each block has an associated count 312, 322, 332, 342, 352 corresponding to the number of executions of the block, determined based on the probe(s) implemented, e.g., at operation 206 (FIG. 2A). For example, Block A, Block C and Block E each have an associated count of ten, Block B has an associated count of one thousand and Block D has an associated count of nine hundred ninety. In this example, Block B may have met the predetermined threshold, described with respect to operation 208 of FIG. 2A, i.e., Block B is a frequently executed source binary code block. Block A, Block C and Block D may be neighboring blocks relative to Block B. Operation 214 of FIG. 2B, search for neighboring blocks that meet/exceed affinity threshold, may yield Block D. Block D is a neighboring source binary code block that meets or exceeds the affinity threshold relative to Block B.

Affinity corresponds to a correlation in likelihood of execution of a frequently executed source binary code block and a neighboring source binary code block. In other words, Block B has a relatively high likelihood of execution (count=1000). Block D also has a relatively high likelihood of execution (count=990). "Likelihood of execution" is used because count information is historical and future execution frequencies may change. The likelihood of execution of Block D is related to the likelihood of execution of Block B, e.g., based on the branches between Block B and Block D. In other words, the likelihood of execution of Block D is correlated with the likelihood of execution of Block B.

In this example, of the five blocks of code, Block B and Block D with relatively higher execution frequencies (i.e., counts) of 1000 and 990, respectively, and that meet or exceed the affinity threshold, are included in the region 305. Instructions in Block B access registers r1, r2, r3, r4 and r5. Registers r1 and r4 are defined (written to) and registers r1, r2, r3, r4 and r4 are used (read from). In other words, for each execution of Block B, r1 and r4 are accessed twice and the remaining registers are each accessed once. Accordingly, for Block B, with execution frequency 1000, r1 and r4 are each accessed 2000 times and the remaining registers are each accessed 1000 times. Block D includes one instruction that accesses register r2 twice (one read and one write) and register r5 once (a read). Accordingly, for Block D, with the execution frequency of 990, r2 is accessed 1980 times and r5 is accessed 990 times. Therefore, for the region 305 that includes Block B and Block D, r1 is accessed a total of 2000 times, r2 is accessed a total of 2980 times, r3 is accessed a total of 1000 times, r4 is accessed a total of 2000 times and r5 is accessed a total of 1990 times. Sorting the registers, by the number of register accesses, from most frequently accessed to least frequently accessed, yields: r2, r1 and r4, r5 and then r3.

Turning again to FIG. 2B, at operation 220, source registers may be mapped to target registers. Source register(s) corresponding to the highest number of accesses, i.e., the most frequently accessed, for the region may be mapped to target register(s). For example, the target ISA may have $N_t$ target processor registers and the source ISA may have $N_s$ source processor registers, where $N_t$ is less than $N_s$. Of the $N_t$ target processor registers, N may be available for mapping, where N is less than or equal to $N_t$. Continuing with the example illustrated in FIG. 3, if N is three, then registers r1, r2 and r4 may be mapped to target processor registers for the region. Registers r3 and r5 may not be mapped to target processor registers and may, therefore, be retrieved from memory as needed.

In some embodiments, the number, N, of target processor registers available for mapping may be less than the number, $N_t$, of processor registers of the target ISA. In other words, one or more target processor registers may be reserved for instructions that, e.g., use or define unmapped source registers. For example, one or two target processor registers may be reserved for such instructions.

Table 1 includes pseudocode corresponding to one example for determining the total number of register accesses for each source register in a region and mapping N source registers to N target registers.

TABLE 1

```
find_opt_reg_map (region R of source code)
    i = 1
    for each register r in the source architecture do
        usage[i].count = 0
        usage[i].reg = r
        i = i + 1
    for each block B in R do
        for each instruction I in B do
            for each register r used by I do
                let i be such that usage[i].reg == r
                usage[i].count += exec_freq[B]
            for each register r defined by I do
                let i be such that usage[i].reg == r
                usage[i].count += exec_freq[B]
    sort usage array in decreasing order of the count field
    for i from 1 to N do
        assign source register usage[i].reg to target_reg[i]
```

Accordingly, at completion of operation 220, N source registers may be mapped to N target registers. Source register(s) not mapped to target register(s) may be mapped to source register storage 118 in system memory 104, cache memory 105 and/or scratch-pad memory 107.

At operation 222, live-in and/or live-out registers may be identified for each binary block in the region. Live-in corresponds to registers that are used (i.e., read from) in the binary block without first being defined (i.e., written to) in the binary block. For example, in region 305 illustrated in FIG. 3, registers r2, r3 and r5 are used without first being defined in Block B and register r2 is used before being defined in Block D. Accordingly, registers r2, r3 and r5 are live-in for region 305. Live-out corresponds to register(s) whose value(s) may have been changed by instructions in the binary block. For example, in region 305, values of registers r1 and r4 may be changed by instructions in Block B and a value of r2 may be changed by the instruction in Block D. Accordingly, r1, r2 and r4 are live-out for region 305. In some embodiments, operation 222 may not be performed, indicated by the dotted line outlining the box representing operation 222.

Figure 4:
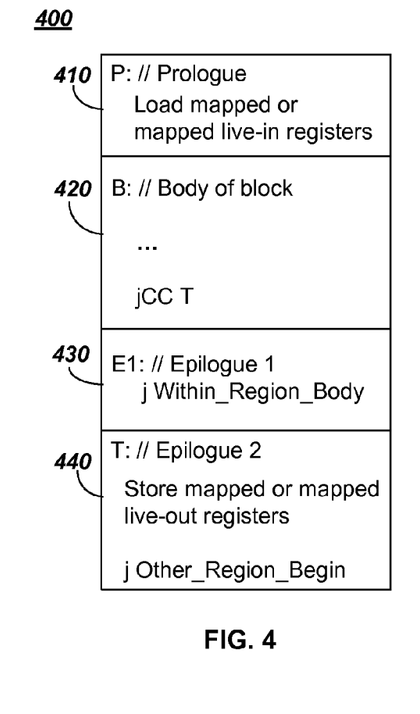
FIG. 4 depicts an exemplary optimized target binary code block, including a prologue, body, jump on condition and at least one epilogue consistent with the present disclosure.

At operation 224, for each binary block in the region, e.g., region 305, an optimized target binary code block may be generated. For example, each optimized target binary code block may include a prologue, a block body that includes translated source code of the corresponding source binary code block and a jump on condition and at least one epilogue. FIG. 4 depicts an example of a target code block 400, including a prologue 410, a block body 420 and two epilogues 430, 440. The jump on condition is included in the block body 420.

The prologue is configured to load target registers with data corresponding to mapped or mapped and live-in source registers from, e.g., source register storage 118. Whether mapped or mapped and live-in source registers are loaded may depend on overhead, i.e., the overhead associated with identifying live-in source registers for each source binary code block in a region versus the overhead associated with loading all of the mapped source registers upon entry into a region. For example, for region 305, depicted in FIG. 3, registers r1, r2 and r4 are mapped to target registers for the region 305. Accordingly, in this example, each prologue associated with Block B and Block D, respectively, may be configured to load source registers r1, r2 and r4 from memory into target registers. In another example, register r2 is both mapped and live-in for region 305. Accordingly, each prologue associated with Block B and Block D, respectively, is configured to load register r2 resulting in fewer memory accesses compared to loading all (i.e., r1, r2, and r4) of the mapped source registers.

The at least one epilogue may include a first epilogue and a second epilogue. The conditional jump is configured to control whether flow proceeds to the first epilogue or the second epilogue, based on whether a branch that ends the source binary code block is to a within region target binary code block or a target binary code block not in the region. A within region target binary code block is an optimized target binary code block, as described herein. A target binary code block not in the region may be an unoptimized target binary code block or an optimized target binary code block associated with another region.

The first epilogue includes a jump to the within region target binary code block. For example, referring again to FIG. 3, a jump from Block B to Block D corresponds to a jump to a within region target binary code block. The second epilogue includes a jump to a target binary code block that is outside the region, e.g., is not in region 305. The second epilogue is further configured to store live-out registers prior to jumping to a next target binary code block. Similar to loading live-in registers as described herein, the second epilogue may be configured to store mapped or mapped live-out registers prior to jumping to the next target binary code block.

Referring again to FIG. 3, a jump from Block B to Block C corresponds to a jump to a target binary code block that is outside the region. The jump to a within region target binary code block is configured to jump to the body of the within region binary code block, bypassing a prologue associated with the within region binary code block. The jump to the outside the region target binary code block is configured to jump to the beginning of the outside the region target binary code block. If the outside the region target binary code block is an optimized target binary code block associated with another region, the jump is to a prologue of the optimized target binary code block.

It may be appreciated that a run time system, i.e., host operating system 120, is configured to perform functions that may not be handled directly by target code, e.g., interrupt handling. In order for these functions to operate properly, it is important that a guest state be at a consistent point, i.e., consistent guest state in the proper data structures in memory. Guest states may not be consistent within execution of a block but are consistent at block boundaries. Accordingly, a dynamic binary translator, such as open-source QEMU, is configured to postpone interrupt handling to the end of a code block. In order to have a consistent guest state at the end of a block, live-out registers may be stored (e.g., in source register storage 118) after a jump to a block within the region, prior to returning to the run time system. For a jump to a block not in the region, the live-out registers may be stored prior to a jump to the block in the region. After the jump to the block not in the region, control may return to the run time system.

Figure 5:
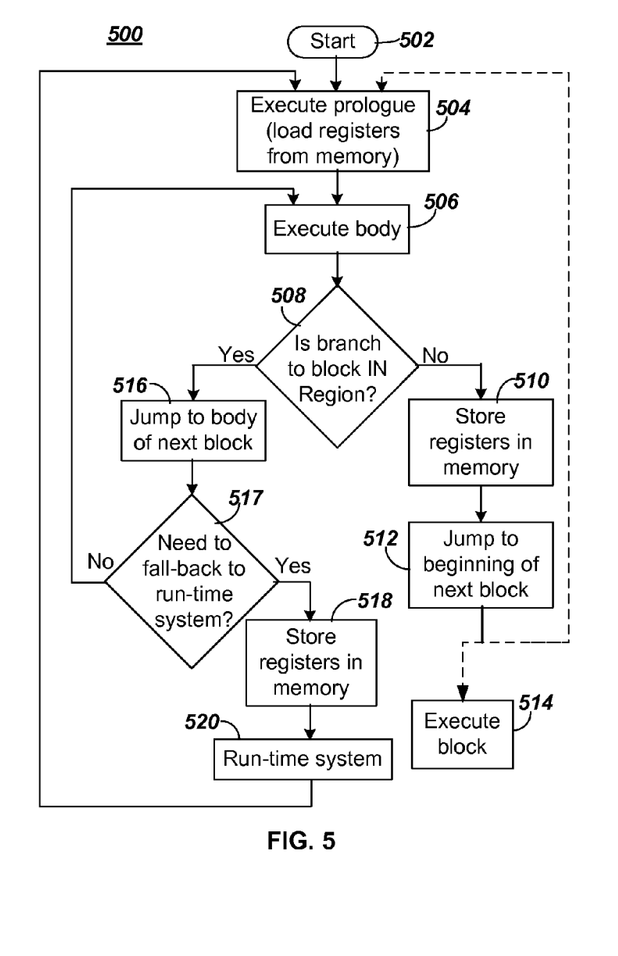
FIG. 5 depicts a flowchart of exemplary operations for executing target binary code blocks, including optimizations consistent with the present disclosure.

FIG. 5 depicts a flow chart 500 of exemplary operations for executing target binary code blocks corresponding to a source binary application that includes at least one optimized code region that includes at least one optimized target binary code block. Program flow may begin at start 502. Start 502 corresponds to entry into a first region of optimized target binary code that includes at least one optimized target code block. At operation 504, a prologue of a first optimized target binary code block in the first region may be executed. The prologue is configured to load mapped or mapped live-in registers from memory, as described herein.

The body of the first optimized target binary code block may then be executed at operation 506. Whether a branch, at a boundary of a source binary code block corresponding to the first optimized target binary code block, is to a target binary code block in the first region may be determined at operation 508. If the branch is to a target binary code block not in the first region, mapped or mapped live-out registers may be stored in memory, e.g., source register storage 118, at operation 510. A jump to a beginning of a next target binary code block, not in the first region, may be executed at operation 512. The next target binary code block may or may not be optimized. If the next target binary code block is not optimized, the next target binary code block corresponding to a next source binary code block may be executed at operation 514. If the next target binary code block is optimized, e.g., in a second region, the prologue (of the next target binary code block in the second region) may then be executed at operation 504 followed by execution of a body of the next target binary code block at operation 506.

If, at operation 508, it is determined that the branch is to a target binary code block in the first region, a jump to the body of the next target binary code block may be executed at operation 516. In some embodiments, registers may be stored in memory, e.g., to facilitate interrupt processing by a run-time system. In these embodiments, whether it is necessary to return to the run-time system may be determined at operation 517. If it is not necessary to return to the run-time system, program flow may proceed to operation 506 and the body (of the next target binary code block) may then be executed at operation 506. If it is necessary to return to the run-time system, registers may be stored in memory at operation 518 and program flow may proceed to the run-time system at operation 520. Upon return from the run-time system, program flow may proceed to operation 504, execute prologue, where registers may be loaded from memory.

Referring to FIG. 4 and FIG. 5, operation 508, determining whether a branch is to a next target binary code block in a region or not in a region, corresponds to the jump on condition (jCC T) of the body 420 of the optimized target binary code block. Operation 516 corresponds to the first epilogue 430, jump within region body. Operations 510 and 512 correspond to the second epilogue 440.

Figure 6:
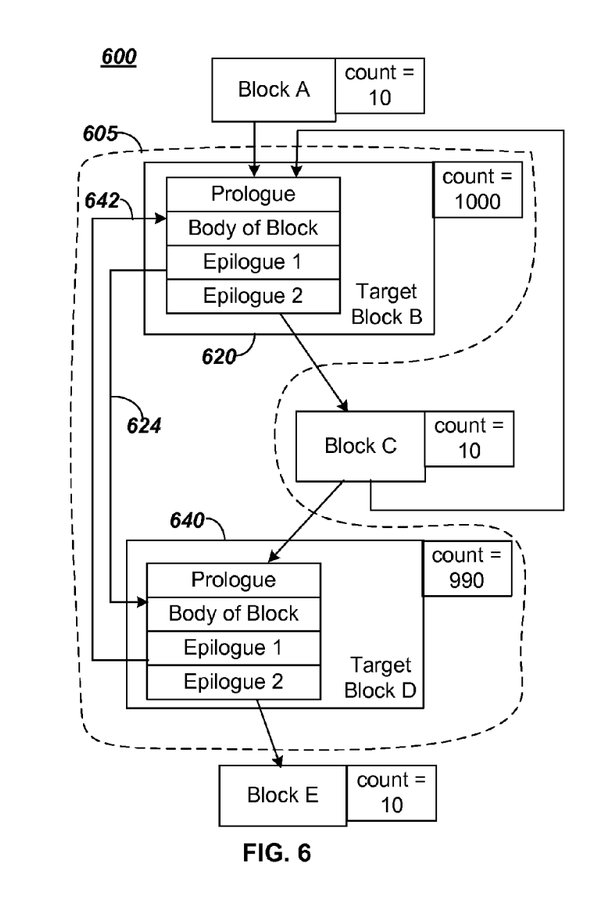
FIG. 6 depicts an exemplary optimized control flow graph corresponding to the control flow graph of FIG. 3.

FIG. 6 depicts an optimized control flow graph 600 corresponding to the example control flow graph 300, depicted in FIG. 3. In the optimized control flow graph 600, Target Block B 620 corresponds to Block B 320 of control flow graph 300 of FIG. 3 and Target Block D 640 corresponds to Block D 340 of control flow graph 300. Target Block B and Target Block D are configured according to target code block 400 of FIG. 4. Control flow between target binary code blocks in optimized control flow graph 600 depends on whether flow is between target binary code blocks in a region or between a target binary code block in the region and a target binary code block not in the region. The target binary code block not in the region may be an optimized target binary code block associated with another region or may be an unoptimized target binary code block. For example, control flow from target Block B to Block C, outside of region 605, is from Epilogue 2 (store mapped or mapped live-outs) of target Block B to Block C (i.e., to the beginning of Block C) and control flow from Block C to target Block D is from Block C to the Prologue (load mapped or mapped live-ins) of target Block D. Control flow between target Block B and target Block D, both in region 605, is from Epilogue 1 of Block B or Block D to the body of Block D or Block B, respectively, illustrated by path 624 and path 642.

Accordingly, as illustrated in the optimized control flow graph 600, a prologue may execute only upon entry into a region. Jumps between target binary code blocks within a region are configured to jump to a body of a target binary code block, bypassing the prologue and memory accesses associated with loading mapped or mapped live-in registers. Advantageously, this may result in performance improvement, e.g., increase in speed, for relatively frequently executed regions of code.

A plurality of regions of optimized target binary code blocks may be generated for a source application. Advantageously, register mapping may be optimized for each region, independent of register mapping optimized for other region (s). In this manner, optimizations are region-specific. In some embodiments, storing mapped or mapped live-out registers may only execute when exiting a region, further enhancing performance.

Figure 7:
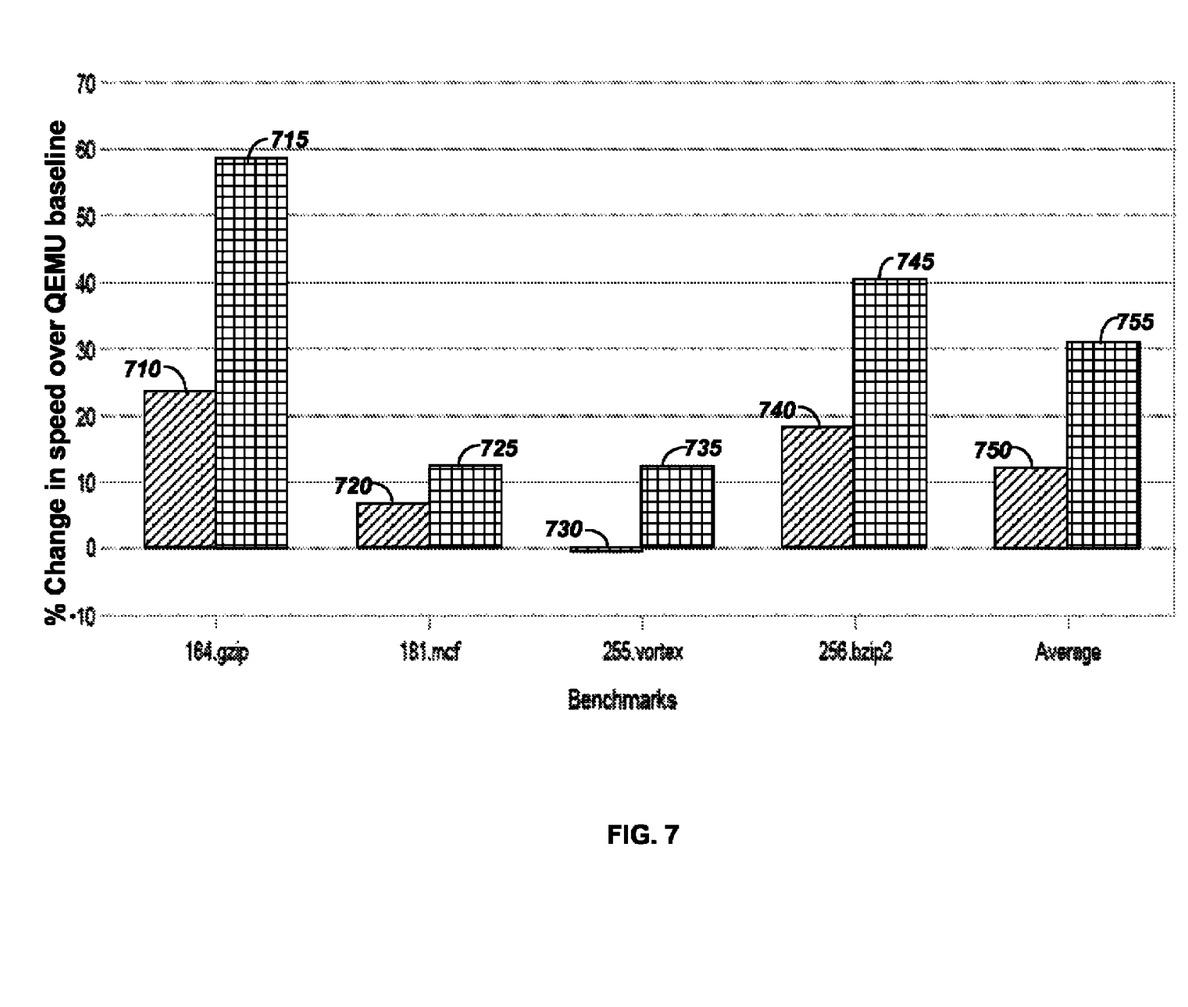
FIG. 7 is a graph illustrating comparison of performance benchmarks of dynamic binary translation including block level register mapping and region level register mapping consistent with the present disclosure.

FIG. 7 is a graph illustrating a comparison of performance benchmarks for dynamic binary translation implementing block level register mapping 710, 720, 730, 740, 750 and region level register mapping consistent with the present disclosure 715, 725, 735, 745, 755. The performance is shown relative to the open-source QEMU dynamic binary translator (that maps registers to memory). In block level register mapping, mapped live-in registers are loaded upon entering each target code block and mapped live-out registers are stored upon exiting each target code block. The illustrated embodiment of region level register mapping consistent with the present disclosure is configured to load mapped live-in registers (from memory) on entry to a region and to store live-out registers (in memory) upon exiting the region. For all of the benchmarks, the region level register mapping consistent with the present disclosure improved performance over a baseline QEMU and block level register mapping. On average, the performance improvement for the benchmarks was about 17% compared to block level register mapping and about 31% compared to QEMU baseline.

Accordingly, a method and system consistent with the present disclosure include mapping source processor registers to target processor registers in dynamic binary translation when there are fewer target processor registers than source processor registers. For a region of code determined to be "hot", i.e., relatively frequently executed, a number of accesses of each source register may be determined. The most frequently accessed source registers may then be mapped to available target registers. For each block of source binary code in the region, a corresponding block of optimized target binary code may be generated that includes a prologue, a body including translated source code and a jump on condition and at least one epilogue. The jump on condition and the at least one epilogue are configured to control flow based on whether a branch from a first target binary code block is to a next target binary code block within the region or to a next target binary code block not in the region. If the next target binary code block is in the region, then a jump is directed to the body of the next target binary code block, bypassing the prologue. If the next target binary code block is not in the region, then a jump is directed to the beginning of the next target binary code block. The prologue is configured to load the mapped or mapped live-in registers for the region from memory. If the next target binary code block is not in the region, then an epilogue is configured to store the mapped or mapped live-out registers prior to jumping to the beginning of the next target binary code block. In this manner, mapped or mapped live-in registers are loaded from memory upon entry to a region and mapped or mapped live-out registers are stored to memory upon exiting a region, reducing memory accesses as compared to block level register loads/stores.

As described herein, optimization depends on probe(s), including counters, inserted with target binary code blocks. Accordingly, execution frequency determined based on the counters represents a finite period of time. If the execution frequency for a region of code changes over time, the performance improvement initially provided by the optimization may degrade, i.e., may become less optimal. Although optimization may be repeated, whether to repeat the procedure as described herein may depend on considerations of time to implement optimization versus time to execute the previously optimized target binary code blocks.

Of course, while FIGS. 2A, 2B and 5 depict exemplary operations according to some embodiments, it is to be understood that in other embodiments all of the operations depicted in FIG. 2A, FIG. 2B and/or FIG. 5 may not be necessary. Indeed, it is fully contemplated herein that other embodiments of the present disclosure may include subcombinations of the operations depicted in FIG. 2A, FIG. 2B and/or FIG. 5 and/or additional operations. Thus, claims directed to features and/or operations that are not exactly shown in one drawing are deemed within the scope and content of the present disclosure.

Memory 104, cache memory 105, and/or scratch-pad memory 107 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 104, cache memory 105, and/or scratch-pad memory 107 may comprise other and/or later-developed types of computer-readable memory.

Embodiments of the methods described herein may be implemented using a processor and/or other programmable device. To that end, the methods described herein may be implemented on a tangible computer readable medium having instructions stored thereon that when executed by one or more processors perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

"Circuitry", as used in any embodiment herein, may comprise, for example, singly or in any combination, hardwired circuitry, programmable circuitry, state machine circuitry, and/or firmware that stores instructions executed by programmable circuitry.

According to one aspect there is disclosed a method. The method may include loading a source binary application including a plurality of source binary code blocks for execution by a computer system. The computer system may include memory and a processing unit including $N_t$ target registers wherein $N_t$ is less than a number, $N_s$, of source registers in a corresponding source instruction set architecture. The method may further include identifying, during runtime of the source binary application, a frequently executed source binary code block within the source binary application; defining a region including the frequently executed source binary code block and at least one neighboring source binary code block that exceeds an affinity threshold, the frequently executed source binary code block and the at least one neighboring source binary code block include at least one source register access and are each bounded by a branch instruction. The method may further include determining a frequency of access for each source register accessed in the region; mapping each of N most frequently accessed source registers in the region to a respective one of the $N_t$ target registers wherein N is less than or equal to $N_t$; and generating an optimized target binary code block corresponding to each source binary code block in the region based at least in part on the register mapping.

According to another aspect there is disclosed an article, including a tangible storage medium having instructions stored thereon which when executed by a processor may result in the following operations: loading a source binary application including a plurality of source binary code blocks for execution, wherein the processor includes $N_t$ target registers wherein $N_t$ is less than a number, $N_s$, of source registers in a corresponding source instruction set architecture; identifying, during runtime of said source binary application, a frequently executed source binary code block within said source binary application; defining a region including the frequently executed source binary code block and at least one neighboring source binary code block that exceeds an affinity threshold, the frequently executed source binary code block and the at least one neighboring source binary code block include at least one source register access and are each bounded by a branch instruction; determining a frequency of access for each source register accessed in the region; mapping each of N most frequently accessed source registers in the region to a respective one of the $N_t$ target registers wherein N is less than or equal to $N_t$; and generating an optimized target binary code block corresponding to each source binary code block in the region based at least in part on the register mapping.

In yet another aspect there is disclosed a system. The system may include a processor including $N_t$ target registers, wherein $N_t$ is less than a number, $N_s$, of source registers in a corresponding source instruction set architecture; and a memory configured to host a dynamic binary translator, a register mapping module and a source binary application including a plurality of source binary code blocks to be executed on the processor, wherein when the dynamic binary translator and register mapping module are executed on the processor at least one of the dynamic binary translator and register mapping module may cause the processor to: identify, during runtime of the source binary application, a frequently executed source binary code block within the source binary application; define a region including the frequently executed source binary code block and at least one neighboring source binary code block that exceeds an affinity threshold, the frequently executed source binary code block and the at least one neighboring source binary code block include at least one source register access and are each bounded by a branch instruction; determine a frequency of access for each source register accessed in the region; map each of N most frequently accessed source registers in the region to a respective one of the $N_t$ target registers wherein N is less than or equal to $N_t$; and generate an optimized target binary code block corresponding to each source binary code block in the region based at least in part on the register mapping.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:
loading a source binary application comprising a plurality of source binary code blocks for execution by a computer system, the computer system comprising memory and a processing unit comprising Nt target registers, wherein the source binary application is configured to be executed in an environment having Ns source registers wherein $N_t$ is less than $N_s$;
identifying, during runtime of said source binary application, a frequently executed source binary code block within said source binary application;
defining a region comprising said frequently executed source binary code block and at least one neighboring source binary code block that exceeds an affinity threshold, the frequently executed source binary code block and the at least one neighboring source binary code block both include instructions to access at least one source register in common, and the frequently executed source binary code block and the at least one neighboring source binary code block are each bounded by a branch instruction;
determining a frequency of access for each source register accessed in the region; and mapping each of N (N is greater than zero) most frequently accessed source registers in the region to a respective one of the $N_t$ target registers wherein N is less than or equal to $N_t$.

2. The method of claim 1 further comprising generating an optimized target binary code block corresponding to each source binary code block in the region based at least in part on said register mapping wherein each optimized target binary code block comprises a prologue configured to load data associated with each mapped source register from memory to a corresponding target register, a body comprising translated source binary code corresponding to the source binary code block and a jump on condition and at least one epilogue, the jump on condition and the at least one epilogue configured to control flow from a first optimized target binary code block in the region to a second target binary code block based, at least in part, on whether the second target binary code block is in the region.

3. The method of claim 2, wherein the at least one epilogue comprises a first epilogue and a second epilogue, the first epilogue is configured to be executed if the second target binary code block is a second optimized target binary code block in the region, the first epilogue comprising a first instruction to jump to a body of the second optimized target binary code block and the second epilogue is configured to be executed if the second target binary code block is not in the region, the second epilogue comprising a second instruction to store each target register corresponding to a respective mapped source register to memory and a third instruction to jump to a beginning of the second target binary code block.

4. The method of claim 1, further comprising identifying live-in and live-out registers for the region comprising identifying live-in and live-out registers for each source binary code block in the region.

5. The method of claim 4, further comprising generating an optimized target binary code block corresponding to each source binary code block in the region based at least in part on said register mapping wherein each optimized target binary code block comprises a prologue configured to load data associated with each mapped and live-in source register from memory to a corresponding target register, a body comprising translated source binary code corresponding to the source binary code block and a jump on condition and at least one epilogue, the jump on condition and the at least one epilogue configured to control flow from a first optimized target binary code block in the region to a second target binary code block based, at least in part, on whether the second target binary code block is in the region.

6. The method of claim 2, further comprising:
executing a prologue of a first optimized target binary code block in the region, said executing comprising loading each of N target registers with data corresponding to a respective one of the N mapped source registers for the region;
executing a body of the first optimized target binary code block, the first optimized target binary code block including a first branch instruction configured to jump to a second target binary code block;
determining whether the second target binary code block is in the region; and
executing a first epilogue to jump to a body of a second optimized target code block corresponding to the second target binary code block if the second target code block is in the region or executing a second epilogue to jump to a beginning of the second target code block if the second target code block is not in the region.

7. The method of claim 5, further comprising:
executing a prologue of a first optimized target binary code block in the region, said executing comprising, for each mapped live-in source register in the region, loading one target register with data from memory corresponding to the mapped live-in source register;
executing a body of the first optimized target binary code block, the first optimized target binary code block including a first branch instruction configured to jump to a second target binary code block;
determining whether the second target binary code block is in the region; and
executing a first epilogue to jump to a body of the second target code block if the second target code block is in the region or executing a second epilogue to store the mapped live-out registers for the region in memory and jump to a beginning of the second target code block if the second target code block is not in said region.

8. The method of claim 1, wherein affinity corresponds to a correlation in likelihood of execution of the frequently executed source binary code block and the at least one neighboring source binary code block.

9. An article, comprising a non-transitory tangible storage medium having instructions stored thereon which when executed by a processor result in the following operations comprising:
loading a source binary application comprising a plurality of source binary code blocks for execution, wherein the processor comprises $N_t$ target registers, wherein the source binary application is configured to be executed in an environment having $N_s$ source registers wherein Nt is less than $N_s$;
identifying, during runtime of said source binary application, a frequently executed source binary code block within said source binary application;
defining a region comprising said frequently executed source binary code block and at least one neighboring source binary code block that exceeds an affinity threshold wherein affinity corresponds to a correlation in likelihood of execution of the frequently executed source binary code block and the at least one neighboring source binary code block, the frequently executed source binary code block and the at least one neighboring source binary code block both include instructions to access at least one source register in common and the frequently executed source binary code block and the at least one neighboring source binary code block are each bounded by a branch instruction;
determining a frequency of access for each source register accessed in the region; and
mapping each of N (N is greater than zero) most frequently accessed source registers in the region to a respective one of the $N_t$ target registers wherein N is less than or equal to $N_t$.

10. The article of claim 9, wherein the instructions that when executed by the processor result in the following additional operations comprising:
generating an optimized target binary code block corresponding to each source binary code block in the region based at least in part on said register mapping wherein each optimized target binary code block comprises a prologue configured to load data associated with each mapped source register from memory to a corresponding target register, a body comprising translated source binary code corresponding to the source binary code block and a jump on condition and at least one epilogue, the jump on condition and the at least one epilogue configured to control flow from a first optimized target binary code block in the region to a second target binary code block based, at least in part, on whether the second target binary code block is in the region.

11. The article of claim 10, wherein the at least one epilogue comprises a first epilogue and a second epilogue, the first epilogue is configured to be executed if the second target binary code block is a second optimized target binary code block in the region, the first epilogue comprising a first instruction to jump to a body of the second optimized target binary code block and the second epilogue is configured to be executed if the second target binary code block is not in the region, the second epilogue comprising a second instruction to store each target register corresponding to a respective mapped source register to memory and a third instruction to jump to a beginning of the second target binary code block.

12. The article of claim 9, wherein the instructions that when executed by the processor result in the following additional operations comprising:
identifying live-in and live-out registers for the region comprising identifying live-in and live-out registers for each source binary code block in the region.

13. The article of claim 12, wherein the instructions that when executed by the processor result in the following additional operations comprising:
generating an optimized target binary code block corresponding to each source binary code block in the region based at least in part on said register mapping wherein each optimized target binary code block comprises a prologue configured to load data associated with each mapped and live-in source register from memory to a corresponding target register, a body comprising translated source binary code corresponding to the source binary code block and a jump on condition and at least one epilogue, the jump on condition and the at least one epilogue configured to control flow from a first optimized target binary code block in the region to a second target binary code block based, at least in part, on whether the second target binary code block is in the region.

14. The article of claim 10, wherein the instructions that when executed by the processor result in the following additional operations comprising:
executing a prologue of a first optimized target binary code block in the region, said executing comprising loading each of N target registers with data corresponding to a respective one of the N mapped source registers for the region;
executing a body of the first optimized target binary code block, the first optimized target binary code block including a first branch instruction configured to jump to a second target binary code block;
determining whether the second target binary code block is in the region; and
executing a first epilogue to jump to a body of a second optimized target code block corresponding to the second target binary code block if the second target code block is in the region or executing a second epilogue to jump to a beginning of the second target code block if the second target code block is not in the region.

15. The article of claim 13, wherein the instructions that when executed by the processor result in the following additional operations comprising:
executing a prologue of a first optimized target binary code block in the region, said executing comprising, for each mapped live-in source register in the region, loading one target register with data from memory corresponding to the mapped live-in source register;
executing a body of the first optimized target binary code block, the first optimized target binary code block including a first branch instruction configured to jump to a second target binary code block;
determining whether the second target binary code block is in the region; and
executing a first epilogue to jump to a body of the second target code block if the second target code block is in the region or executing a second epilogue to store the mapped live-out registers for the region in memory and jump to a beginning of the second target code block if the second target code block is not in said region.

16. A system, comprising:
a processor comprising Nt target registers; and a memory configured to store a dynamic binary translator, a register mapping module and a source binary application configured to be executed in an environment having N s source registers wherein $N_t$ is less than $N_s$, the source binary application comprising a plurality of source binary code blocks to be executed on the processor, wherein when the dynamic binary translator and register mapping module are executed on the processor at least one of the dynamic binary translator and register mapping module cause the processor to:

identify, during runtime of said source binary application, a frequently executed source binary code block within said source binary application;

define a region comprising said frequently executed source binary code block and at least one neighboring source binary code block that exceeds an affinity threshold, the frequently executed source binary code block and the at least one neighboring source binary code block both include instructions to access at least one source register in common, and the frequently executed source binary code block and the at least one neighboring source binary code block are each bounded by a branch instruction;

determine a frequency of access for each source register accessed in the region; and map each of N (N is greater than zero) most frequently accessed source registers in the region to a respective one of the $N_t$ target registers wherein N is less than or equal to $N_t$.

17. The system of claim 16, wherein the register mapping module further causes the processor to generate an optimized target binary code block corresponding to each source binary code block in the region based at least in part on said register mapping wherein each optimized target binary code block comprises a prologue configured to load data associated with each mapped source register from memory to a corresponding target register, a body comprising translated source binary code corresponding to the source binary code block and a jump on condition and at least one epilogue, the jump on condition and the at least one epilogue configured to control flow from a first optimized target binary code block in the region to a second target binary code block based, at least in part, on whether the second target binary code block is in the region.

18. The system of claim 17, wherein the at least one epilogue comprises a first epilogue and a second epilogue, the first epilogue is configured to be executed if the second target binary code block is a second optimized target binary code block in the region, the first epilogue comprising a first instruction to jump to a body of the second optimized target binary code block and the second epilogue is configured to be executed if the second target binary code block is not in the region, the second epilogue comprising a second instruction to store each target register corresponding to a respective mapped source register to memory and a third instruction to jump to a beginning of the second target binary code block.

19. The system of claim 16, wherein the register mapping module further causes the processor to identify live-in and live-out registers for the region comprising identifying live-in and live-out registers for each source binary code block in the region.

20. The article of claim 9, wherein affinity corresponds to a correlation in likelihood of execution of the frequently executed source binary code block and the at least one neighboring source binary code block.

21. The system of claim 16, wherein affinity corresponds to a correlation in likelihood of execution of the frequently executed source binary code block and the at least one neighboring source binary code block.

* * * * *